United States Patent
Lacourse et al.

(10) Patent No.: US 6,287,621 B1
(45) Date of Patent: *Sep. 11, 2001

(54) SWEETENED EXTRUDED CEREALS CONTAINING PREGELATINIZED HIGH AMYLOSE STARCHES

(75) Inventors: Norman L. Lacourse, Fishers, IN (US); Paul A. Altieri, Belle Mead; James P. Zallie, Hillsborough, both of NJ (US)

(73) Assignee: National Starch and Chemical Investment Holding Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/733,381

(22) Filed: Oct. 17, 1996

Related U.S. Application Data

(63) Continuation-in-part of application No. 08/460,082, filed on Jun. 2, 1995, now abandoned, which is a continuation-in-part of application No. 08/436,071, filed on May 5, 1995, now abandoned, which is a continuation-in-part of application No. 08/270,844, filed on Jul. 5, 1994, now abandoned, which is a continuation of application No. 08/012,961, filed on Jan. 29, 1993, now abandoned, which is a continuation of application No. 07/695,112, filed on May 3, 1991, now abandoned.

(51) Int. Cl.$^7$ .................................................. A21D 10/00
(52) U.S. Cl. .......................... 426/549; 426/559; 426/620; 426/621; 426/516
(58) Field of Search .................................. 426/549, 559, 426/560, 618, 619, 620, 621, 516

(56) References Cited

U.S. PATENT DOCUMENTS

| | | |
|---|---|---|
| Re. 27,531 | 12/1972 | Murray et al. . |
| 3,086,890 | 4/1963 | Sarko et al. ................ 127/691 |
| 3,407,070 | 10/1968 | Murray et al. ................ 99/83 |
| 3,515,591 | 6/1970 | Feldmann et al. .............. 127/32 |
| 3,630,775 | 12/1971 | Winkler ...................... 127/71 |
| 3,652,294 | 3/1972 | Marotta et al. ................ 99/83 |
| 3,751,268 | 8/1973 | Van Patten et al. ........... 99/100 |
| 3,987,210 | 10/1976 | Cremer ........................ 426/550 |
| 4,238,517 | 12/1980 | Bosley et al. ................ 426/250 |
| 4,251,551 | 2/1981 | Van Hulle et al. ............. 426/242 |
| 4,251,556 | 2/1981 | Burkwall et al. .............. 426/332 |
| 4,280,851 | 7/1981 | Pitchon et al. ............... 127/33 |
| 4,409,250 | 10/1983 | Van Hulle et al. ............. 426/242 |
| 4,504,509 | 3/1985 | Bell et al. ................... 426/549 |
| 4,529,607 | 7/1985 | Lenchin et al. ............... 426/94 |
| 4,544,563 | 10/1985 | Lechthaler ................... 426/276 |
| 4,562,082 | 12/1985 | Morimoto .................... 426/104 |
| 4,595,597 | 6/1986 | Lenchin et al. ............... 426/555 |
| 4,600,472 | 7/1986 | Pitchon et al. ............... 159/44 |
| 4,608,265 | 8/1986 | Zwiercan et al. .............. 426/582 |
| 4,610,760 | 9/1986 | Kirkpatrick et al. ........... 159/401 |
| 4,623,548 | 11/1986 | Willard ....................... 426/559 |
| 4,623,550 | 11/1986 | Willard ....................... 426/559 |
| 4,695,475 | 9/1987 | Zwiercan et al. .............. 426/582 |
| 4,844,937 | 7/1989 | Wilkerson et al. ............. 426/559 |
| 4,871,398 | 10/1989 | Katcher et al. ............... 127/71 |
| 4,873,110 | 10/1989 | Short et al. .................. 426/621 |
| 4,874,628 | 10/1989 | Eden et al. ................... 426/578 |
| 4,937,091 | 6/1990 | Zallie et al. ................. 426/582 |
| 4,938,982 | 7/1990 | Howard ....................... 426/559 |
| 4,948,615 | 8/1990 | Zallie et al. ................. 426/578 |
| 4,971,723 | 11/1990 | Chiu ........................... 252/315.3 |
| 5,131,953 | 7/1992 | Kasica . |
| 5,149,799 | 9/1992 | Rubens . |
| 5,188,674 | 2/1993 | Kasica . |

FOREIGN PATENT DOCUMENTS 0366898    5/1990   (EP) .

OTHER PUBLICATIONS

Anon, HI–SET CHG, National Starch and Chemical Corporation, Technical Service Bulletin, 1987.
Anon, Hylon V, National Starch and Chemical Corporation, Technical Service Bulletin, 1988.
Anon, HI–SET 377, National Starch and Chemical Corporation, Technical Service Bulletin, 1987.
Anon, HI–SET 30, National Starch and Chemical Corporation, Technical Service Bulletin, 1987.
Anon, HI–SET C, National Starch and Chemical Corporation, Technical Service Bulletin, 1988.
Anon, HI–SET Starches, National Starch and Chemical Corporation, Technical Service Bulletin, 1985.
Anon, ULTA–SET LT High Performance Starch, National Starch and Chemical Corporation, 9/89.
Zallie, The Role and Function of Specialty Starches in the Confection Industry, National Starch and Chemical Corporation, 3/89.
Anon, Hylon VII, National Starch and Chemical Corporation, Technical Service Bulletin, 1988.
Anon; HI–SET 60, National Starch and Chemical Corporation, Technical Service Bulletin, 1988.
R. Chinnaswamy et al. (Cereal Chemistry 65, No. 2, 138–143 (1988).
Case, S.E. et al., Cereal Chem. 69(4): 401–404.
Anon, Crisp Film, National Starch and Chemical Corporation, Technical Service Bulletin, 1988.

Primary Examiner—Leslie Wong
(74) Attorney, Agent, or Firm—Laurelee Ducan, Esq.; Karen Kaiser, Esq.

(57) ABSTRACT

The present invention provides a method for preparing a dry, sweetened, extruded, ready to eat flaked or puffed cereal. Cereal flours, sweeteners such as sugars and/or syrups, and other cereal ingredients are formulated with added water and about 4–28%, preferably 5–15% of selected pregelatinized spray-dried starches having an amylose content of at least about 70% or up to 25% of a preextruded fully dispersed high amylose flour having an amylose content of at least about 70%. The pregelatinized high amylose starch may be unmodified or converted and in granular or non-granular form. The cereal is extruded at a temperature of about 120–160° C. and a pressure of about 100 to 500 psi.

19 Claims, No Drawings

SWEETENED EXTRUDED CEREALS CONTAINING PREGELATINIZED HIGH AMYLOSE STARCHES

This application is a continuation-in-part of application Ser. No. 08/460,082 filed Jun. 2, 1995, now abandoned, which is a continuation-in-part of application Ser. No. 08/436,071 filed May 5, 1995, now abandoned, which is a continuation-in-part of application Ser. No. 08/270,844 filed Jul. 5, 1994, now abandoned, which is a continuation of application Ser. No. 08/012,961 filed Jan. 29, 1993, now abandoned, which is a continuation of application Ser. No. 07/695,112 filed May 3, 1991, now abandoned.

BACKGROUND OF THE INVENTION

This invention relates to dry, extruded cereals formulated with sweeteners and selected high amylose starches.

Native high amylose starches are corn starches from hybrid varieties of corn which contain at least about 40% amylose. In contrast, ordinary corn starch typically contains about 28% amylose.

The use of granular non-pregelatinized high amylose starch, optionally modified, in farinaceous-based extruded products is disclosed in U.S. Pat. No. 3,407,070 (issued Oct. 22, 1968 to D. G. Murray et al.). The suggested food products include crackers, chips, cereal puffs, and other "snack" items. The total concentration from the high amylose starch is from about 5 to 60%, based on the total weight of solids in the blend. Concentrations below 5% result in gummy extruded products of low rigidity. Concentrations exceeding 60% tend to make the extruded product exceedingly dense thereby precluding the attainment of a porous, puffy appearance. Moisture should be present in the extruded mixture. Water concentrations from 15–50%, preferably 20–40%, based on the total weight of the composition, are ordinarily used. The moisture inherently present in the various components is not included in determining the amount of water to be added to the dry blend. Sufficient heat and pressure are used to hydrate and gelatinize the starch and cook the farinaceous base. Typically a barrel temperature of about 200° to 350° F. and a pressure of about 50 to 1000 p.s.i. is used. Where the product emerges from a hot extruded die and flashing off is used to put the product in its final form, there is no need for a subsequent cooking step. Where the product emerges from a cooled extruded die, the product is cooked further (e.g., baked or fried) to reduce the moisture content.

The relationship between the amylose content and the extrusion-expansion properties of corn starches containing 10, 25, 50 and 65% amylose was studied by R. Chinnaswamy et al. (Cereal Chemistry 65, No. 2, 138–143 (1988). Granular starches and starch mixtures were extrusion cooked at different temperatures and different moisture contents. No other ingredients were present to compete with the granular starch for the water. All starches were extruded under optimal conditions. The expansion ratio initially increased from 8.3 to 16.4 as the amylose content of the native starch increased from 0 to 50% and then decreased sharply. The maximum expansion ratios were 11.9 for 0% amylose (i.e., waxy starch), 14.2 for 25% native amylose, 16.4 for 50% native amylose, and 11.8 for 70% native amylose which occurred at 130, 140, 150, and 160° C., respectively. Blended starches (obtained by blending native corn starches with native waxy starch (which contains no amylose) showed similar trends but with lower expansion. The results show native starches having 50% amylose levels expanded best and that starch type, in addition to amylose content plays an important role in determining expansion characteristics during extrusion cooking.

Due to the highly bonded linear structure of high amylose starches, full and effective gelatinization of granular high amylose starches typically requires cooking temperatures of about 154–171° C. However, in the Chinnaswamy et al. study, even at 160° C. the native 70% amylose starch was no better than the waxy starch.

Ready-to-eat breakfast cereals generally fall into one or two categories, i.e., non-presweetened and presweetened cereals. In spite of this industry-recognized distinction, both products contain sweeteners which provide many functional properties in addition to flavor. Non-presweetened cereals usually contain 6–12% sucrose, whereas presweetened cereals usually contain 6–20% sucrose. Sweeteners not only affect the finished cereal, they also may dramatically influence the cereal's behavior during production, particularly with extruded cereals where the presence of high sweetener levels can even determine equipment design.

As is pointed out in the article "Sugar in the Mornin':Sweeteners in Breakfast Cereals", sweeteners affect the chemical and physical properties of extruded cereals because they compete with starch for the available water. Certain effects are generally observed. First and foremost is inhibition of starch gelatinization which alters the cooking requirements for the cereal mass and reduces the viscosity of the mass. By holding onto moisture, sweeteners also inhibit moisture release which hampers the product's expansion. To assure proper starch gelatinization, the residence time and/or process temperature can be increased or the screw design can be adjusted.

Sweeteners will also affect the cooking of whole grains for flaking, puffing, or shredding, because, as with extrusion, there is competition for moisture which creates the need for increased processing temperature or extended cooking times to gelatinize the starch. In addition, the sweeteners can make the grain mass sticky and difficult to machine. According to the above article, this is particularly noticeable in flaking and puffing where individual grain identity is a requirement. Few processing solutions exist and the stickiness is usually controlled by monitoring the overall sugar level.

Thus, at the relatively low total processing moisture content used in extruding the cereals, i.e., 15–22% for extruded puffed cereals and 25–35% for extruded flaked cereals, and at the typical extrusion temperatures of about 120–160° C., granular high amylose starches will not gelatinize in the presence of sweeteners.

High amylose starches pregelatinized by conventional methods are not suitable because conventional methods such as drum drying or jet-cooking and spray-drying produce retrograded starches, or starches that are incapable of full dispersion, or starches that are so degraded that their functional benefits are substantially reduced. See U.S. Pat. No. 3,515,509 (issued Jun. 2, 1970 to Feldman et al.) which discloses that drum-dried potato amylose retrograded upon storage and was unsuitable in package foods. See also the discussion in U.S. Pat. No. 5,188,674 (issued Feb. 23, 1993 to J. Kasica et al.) regarding the difficulty of preparing soluble high amylose starches by jet cooking and spray drying because the starch cooks are difficult to atomize because of their high viscosity and because the starch retrogrades.

The gelatinization and dispersibility characteristics of high amylose starches can be modified by derivatization. The use of these "modified starches" is undesirable in food products that are advertised as "natural" products. In addition, the gel strength and water-resistance of "modified" starches are also reduced in proportion to the amount of derivatization.

Thus, there is a need for soluble high amylose starches that can be formulated into ready-to-eat, sweetened extruded cereals without altering the conventional processing conditions and still provide puffed or flaked cereals with acceptable eating characteristics.

SUMMARY OF THE INVENTION

The present invention provides dry, ready-to-eat, sweetened, puffed or flaked cereals which can be prepared by extrusion and which are characterized by better expansion during extrusion, improved appearance or texture (e.g., crispness), and/or improved bowl life (i.e., resistance to sogginess).

The cereals are prepared by adding to a sweetened farinaceous-based cereal formulation an effective amount, typically about 5–20% by weight, of selected unmodified or converted pregelatinized spray-dried starches having an amylose content of at least about 70% or by adding 5–25% by weight of an extruded fully dispersed high amylose starch or flour having an amylose content of at least about 70%.

One suitable pregelatinized high amylose starch is prepared by the coupled continuous jet-cooking/spray-drying process described in U.S. Pat. No. 5,131,953 (issued Jul. 21, 1992 to J. Kasica et al.). The starch is substantially non-crystalline, substantially non-retrograded, and fully predispersed. Another suitable pregelatinized high amylose starch is prepared by the steam atomization spray-drying process described in U.S. Pat. No. 4,280,851 (issued Jul. 28, 1981 to E. Pitchon et al.). The starch is uniformly gelatinized and in the form of granular indented spheres, with at least a majority of the granules being whole and unbroken and with some of the starch granules being in the form of loosely-bound agglomerates. Mixtures of the pregelatinized spray-dried starches may be used, as well as mixtures of the pregelatinized spray-dried starch and the predispersed flour.

The cereal formulations also contain an effective amount of a sweetener, about 4–28% added water, cereal flours such as corn, oat, and wheat and cereal grains such as wheat flakes. The amount of sweetener will depend not only upon the specific sweetener used but also on whether the cereal is classified as a non-presweetened cereal or a presweetened cereal.

Typical sweeteners include sugars such as sucrose or crystalline fructose, syrups such as corn syrup, high fructose corn syrup, invert syrup (a combination of dextrose and fructose), and malt syrup, fruit concentrates such as apple juice, pear juice, and white grape juice and artificial sweeteners such as aspartane.

Typically, sucrose is present in amounts of only about 3% in cereals prepared by cooking the whole grain, about 6–12% in non-presweetened formulated cereals, and about 6–20% in presweetened formulated cereals.

The amount of added water should be sufficient to provide a total water content in the cereal formulation to be extruded of about 15–22% for puffed cereals and 25–35% for flaked cereals.

Optionally, other ingredients such as salt, flavorings, and leavening agents, which are typically used in extruded cereals are included.

The pregelatinized spray-dried starches or predispersed flour can be completely and thoroughly dispersed into the cereal formulation, prior to extrusion, as a dry ingredient or can be added as an aqueous dispersion in hot or cold water. Typically, the added water is sprayed onto the blended cereal ingredients or added directly to the extruder.

The sweetened cereal formulations which contain these pregelatinized high amylose starches are easier to extrude than sweetened cereal formulations which contain ungelatinized granular high amylose starches or ungelatinized derivatized high amylose starches. The sweetened cereals can be formulated at their typically low moisture contents of 10–20% and can be extruded at normal extrusion conditions.

DESCRIPTION OF THE PREFERRED EMBODIMENTS

As used herein, "high amylose starch" includes starches containing at least about 70% amylose which are obtained from hybrid strains of corn. The starch may be derived from any high amylose plant source which contains concentrations of about 70% amylose or above.

As used herein, "dry" refers to extruded foods containing no more than 10% moisture, typically 3–7%.

As used herein, "pregelatinized" and "fully predispersed" mean that the high amylose starches in powdered form may be readily hydrated and dispersed in hot or cold water or an aqueous medium to provide a starch solution in the form of a complex colloidal dispersion rather than a true molecular solution.

Because amylose, a linear polymer, readily aligns or associates through hydrogen bonding, starches containing large amounts of amylose will form more rigid gels and stronger, tougher films. In food applications they will provide surfaces having reduced air, water and oil absorption and migration relative to ordinary starches which contain much less amylose. The unique film forming, structural and textural characteristics of the high amylose starches make them useful in dry extruded foods, where these starches provide improved organoleptic qualities. In particular expansion properties are improved and the formulations may be modified to contain more fiber, have better moisture resistance, and the like, without sacrificing crispness and other textural qualities.

The use of particular cooking and spray-drying methods for providing pregelatinized non-granular and granular high amylose starches is a significant feature of the invention. The high amylose starches are cooked and spray-dried under conditions which provide pregelatinized starches with unique properties. The use of stabilized high amylose starches (e.g., derivatized starches such as a hydroxypropyl ether or an acetate ester) adversely affects one of more of the combination of desired properties of the extruded cereal.

The unmodified or converted high amylose starches are pregelatinized by one of the following processes.

Simultaneous Steam Atomization/Spray-Drying Process

A method for preparing suitable spray-dried, granular pregelatinized starches is described in U.S. Pat. No. 4,280, 851 (issued Jul. 28, 1981 to E. Pitchon, et al.), the disclosure of which is hereby incorporated by reference. A slurry of the unmodified or converted high amylose starch is cooked or gelatinized in an atomized state. The slurry to be cooked is injected through an atomization aperture in a nozzle assembly to form a relatively finely-divided spray. A heating medium is also injected through an aperture in the nozzle assembly into the spray of atomized material to heat the starch to a temperature effective to gelatinize the starch. An enclosed chamber surrounds the atomization and heating medium injection apertures and defines a vent aperture positioned to enable the heated spray of starch to be atomized again as the starch exits the chamber. In this dual-atomization process, the arrangement is such that the lapsed time between passage of the spray of starch through the chamber, i.e., from the atomization aperture and through the vent aperture defines the gelatinization time of the starch.

Other nozzles suitable for use in the preparation of these starches are described in U.S. Pat. No. 4,610,760 (issued Sep. 9, 1986 to P. A. Kirkpatrick, et al.).

A process for agglomerating these starches is described in U.S. Pat. No. 4,871,398 (issued Oct. 3, 1989 to Katcher, et al.).

A single-atomization method for preparing suitable spray-dried, substantially pregelatinized starches is described in U.S. Pat. No. 5,149,799 (issued Sep. 22, 1992 to R. Rubens), the disclosure of which is hereby incorporated by reference.

Coupled Jet-Cooking/Spray-Drying Process

A method for preparing suitable spray-dried, non-granular pregelatinized starches is described in U.S. Pat. No. 5,131,953 (issued Jul. 21, 1992 to J. Kasica et al.), the disclosure of which is hereby incorporated by reference. The process comprises the steps of:

(a) forming a slurry or a paste of the unmodified or converted high amylose starch and water;

(b) jet-cooking the aqueous slurry or paste of the starch with steam at a temperature sufficient to fully disperse or solubilize the starch;

(c) conveying and introducing the jet-cooked dispersion or solution into a nozzle of a spray-dryer at substantially the same temperature and pressure used in the jet-cooking step;

(d) atomizing the jet-cooked dispersion or solution through the nozzle of the spray-dryer;

(e) drying the atomized mist of the jet-cooked starch within the spray-dryer; and (f) recovering the jet-cooked and spray-dried starch as a water-dispersible or water-soluble powder.

Typical cooking temperatures are about 138–177° C. (280–350° F.). The cooking chamber pressure used typically ranges from 20 to 150 psig and is the saturation pressure of steam at the temperature used plus the small incremental pressure needed to move the dispersion through the chamber. Cooking chamber pressures of 80 to 150 psig, most preferably 100 to 130 psig, are suitable.

An essential step in the above process is conveying the thoroughly cooked, substantially fully dispersed starch, under elevated pressure and temperature, to the spray-dryer atomization nozzle. In the preferred method, a low shear pneumatic nozzle is used and the transfer is carried out at substantially the same temperature and pressure used in the jet-cooking and without any venting to the atmosphere.

Atomization in a pressure nozzle may be used. The pressure of the atomization gas (steam or air) must be sufficient to atomize the cooked starch dispersion into small droplets and to allow rapid drying to an appropriate moisture content without retrogradation. Use of a pressure nozzle requires insertion of a high pressure pump (2,000 to 10,000 psig) between the jet-cooker and atomization nozzle. The temperature after passage through the high pressure pump should be maintained so that it is substantially equivalent to the jet-cooking chamber temperature. The pressure after the high pressure pump must be sufficient to properly atomize the cook to allow rapid drying to an appropriate moisture content without retrogradation.

Conversion of the High Amylose Starches

If the starch is to be converted, the conversion is typically carried out before the jet-cooking/spray-drying processes. Converted starches having a calcium chloride ($CaCl_2$) viscosity of 25–45 seconds, preferably 25–35 seconds, most preferably 30–35 seconds, are useful herein.

Acid-conversion is preferred due to the ease of handling and recovering a granular starch as opposed to starch in dispersed form as necessitated by enzyme conversion. The only enzymes useful herein are those which cleave the 1,4-oligosaccharide links of the starch, e.g., most amylase enzymes. As will be shown in the example, debranching enzymes which cleave the 1,6-oligosaccharide links of the starch, e.g., pullulanase, are not suitable for use here.

In the preparation of the converted starches by acid-conversion, the granular starch is hydrolyzed to the desired degree in the presence of an acid, such as sulfuric or hydrochloric acid, at a temperature below the gelatinization temperature of the starch. The starch is slurried in water, and the acid (usually in concentrated form) is then added. Typically, the reaction takes place over an 8–16 hour period, after which the acid is neutralized with alkali (e.g., to Ph of 5.5), and the starch is recovered by filtration.

It should be appreciated that the degree of conversion, as indicated by the $CaCl_2$ viscosity, is affected by the amount of acid or enzyme used as well as the time and temperature. The conversion conditions should be adjusted to provide an appropriate $CaCl_2$ viscosity.

Suitable conversion procedures are described in *Handbook of Water-Soluble Gums and Resins*, Robert L. Davidson (Editor), Chapter 22: "Starch and Its Modifications" by M. W. Rutenberg, pp. 22–30 to 22–34, (McGraw Hill Book Co., New York 1980).

Preextrusion Process

A preextruded, fully predispersed high amylose starch or flour may be provided by the following steps:

(a) forming a slurry or paste of the unmodified high amylose starch or flour in about 10 to 25% water;

(b) extruding the slurry or paste at a temperature of about 110 to 150° C.; and (c) recovering the starch or flour in a powdered form.

The preextrusion process is preferably carried out in a twin-screw extruded where the rotating screws are contained within a horizontal cylindrical barrel with an entry port at one end and a shaping die at the other end. The starch slurry or paste may be extruded in any shape, dried if desired, and ground to any particle size desired for a particular cereal application.

Extruded Cereals Containing Soluble High Amylose Starch

The extruded cereals may be prepared by any extrusion method known in the art, provided that the method is suitable for sweetened cereal formulations containing 4–28% by weight added water and about 5–20%, preferably 10–15%, by weight (on a dry weight basis), of the pregelatinized spray-dried unmodified or converted high amylose starch containing at least about 70% amylose or up to 25%, by weight (on a dry weight basis) of the prextrudent fully dispersed starch or flour containing at least 70% amylose.

Extrusion methods which can be carried out at a temperature of 120° C. up to 160° C. and a pressure of up to 500 psi are preferred.

The sweetened cereal may be extruded as sheets, rods or other shapes which can be cut and further processed to form the desired flaked or puffed cereals. If a sweetened flaked cereal is being prepared, the extruded moist pieces (referred to in the industry as the half-product), which have a moisture content of about 305, compressed and then toasted at 180–250° C., preferably 200–210° C., for 2–6 minutes. During extrusion of sweetened cereal formulations which are to be compressed into flaked cereals, the temperature in the extruded is higher near the entrance of the extruded (e.g., about 150–180° C.) and lower near the exit of the extruded (e.g., about 45–80° C.) in order to retain the moisture in the extrudate and flake. During extrusion of sweetened cereal formulations which are to be expanded into puffed cereals, the temperature in the extruded is lower near the inlet (25–40° C.) and higher near the outlet (130–160° C.) so that excess moisture will be flashed off and the cereal expanded after it exits. The puffed cereals are toasted at 180–250° C., preferably 200–210° C., for 30 seconds to 3 minutes. Typically, the puffed and flaked cereals are toasted in a fluidized bed.

The pregelatinized spray-dried unmodified or converted high amylose starches can be used in sweetened extruded cereals alone or in combination with other starches; Particularly useful is a mixture of 70% by weight steam atomized/ spray-dried mixture of high amylose starch and 30% by weight corn starch.

Starches preferred for use in combination with the pregelatinized high amylose starch include corn, potato, sweet potato, rice, sago, tapioca, waxy maize, sorghum, or the like (e.g., corn, fluidity corn or tapioca starches). Flours may also be used as a starch source. When a second starch component is present, the pregelatinized high amylose starch must be present in an amount sufficient to provide extruded cereals with crisp textures, good expansion volume after extrusion, and improved bowl life at the extrusion temperatures, pressures, and moisture contents normally used for dry, ready-to-eat extruded cereals. When a combination of starches is used in the cereal formulations, the starches can be used as a one-part system, i.e., they may be pregelatinized by cooking both starches at the same time and then drying the resulting cooked starch blend by the pregelatinization methods disclosed herein. They also can be used as a two-part system in which case the pregelatinized spray-dried high amylose starch is prepared and added to the cereal formulation, and the second starch component is blended with the pregelatinized spray-dried high amylose starch or separately added to the cereal formulation.

Water Solubility Measurement
A. Cold Water Solubility

The determination is carried out using distilled water at room temperature. About 0.5 g of starch is dispersed in 30–40 ml of water in a semi-micro stainless steel cup on a Waring blender base (Model 31B292). The blender is run at low speed while the starch is added (all at once) and then run at high speed for 2 minutes. The dispersion is immediately transferred to a 50 ml volumetric flask and diluted to 50 ml with water. A 25 ml portion of the stock dispersion (shaken well to ensure a homogenous dispersion) is removed by pipet and transferred to a 50 ml centrifuge tube. The sample is spun down at 1800–2000 rpms for 15 minutes. Once spun down, 12.5 ml of supernatant is pipetted into a 25 ml volumetric flask, 5 ml of 5 N potassium hydroxide (KOH) are added with swirling, and the mixture is diluted with water. The remainder of the stock dispersion is shaken well and the insoluble starch dispersed with 10 ml of 5 N KOH while swirling. The mixture is diluted to 50 ml with water. The optical rotation of both the concentrated stock solution and the supernatant solution is measured.

$$\% \text{ Cold Water Solubles} = \frac{\text{Optical Rotation of Supernatant}/\text{Path Length of Supernatant}}{\text{Optical Rotation of Stock Solution}/\text{Path Length of Stock Solution}} \times 100$$

B. Hot Water Solubility

The procedure is the same as that described above except that boiling distilled water at 90–100° C. (194–212° F.) Isis used for dispersing the starch and for all subsequent dilutions. No attempt is made to maintain this temperature during the remainder of the procedure.

Calcium Chloride Viscosity (7.2% SOLIDS TESt)

The calcium chloride viscosity of the converted high amylose starch is measured using a Thomas Rotation Shear-Type Viscometer standardized at 30° C. (86° F.) with a standard oil having a viscosity of 24.73 cps, which oil requires 23.12±0.05 seconds for 100 revolutions. As the conversion of the starch increases, the viscosity of the starch decreases and the calcium chloride viscosity decreases. Accurate and reproducible measurements of the calcium chloride viscosity are obtained by determining the time which elapses for 100 revolutions at a specific solids level.

A total of 7.2 g of the converted starch (anhydrous basis) is slurried in 100 g of buffered 20% calcium chloride solution in a covered semi-micro stainless steel cup (250 ml capacity available from Eberbach), and the slurry is transferred to a glass beaker and is heated in a boiling water bath for 30 minutes with occasional stirring. The starch solution is then brought to the final weight (107.2 g) with hot distilled water (at approximately 90–100° C. (194–212° F.)). The time required for 100 revolutions of the resultant solution at 81–83° C. (178–181° F.) is measured three times in rapid succession and the average of the three measurements is recorded.

The calcium chloride solution is prepared by dissolving 264.8 g of reagent grade calcium chloride dihydrate in 650 ml of distilled water in a tared 1 L glass beaker. Thereafter 7.2 g of anhydrous sodium acetate is dissolved in the solution. The solution is allowed to cool and the Ph is measured. If necessary, the solution is adjusted with hydrochloric acid to Ph 5.6±0.1. The solution is then brought to weight (1007.2 g) with distilled water.

EXAMPLE 1

This example illustrates the preparation of regelatinized non-granular unmodified high amylose tarches by the coupled jet-cooking/spray-drying process.
Part A—Unmodified Starch The process variables used for jet-cooking/spray-drying unmodified high amylose corn starch (about 70% an 85% amylose) are shown below. A slurry of the starch was fed into a jet-cooker (model C-15 available from National Starch and Chemical Company). Steam was metered into the slurry to cook the starch. The cooked starch was conveyed to a pneumatic atomization nozzle top mounted in a 35 foot tall, 16 foot diameter Hensey spray-dryer. Steam at 120 psig was used to atomize the starch. The atomized starch mist was dried with air at 204° C. (400° F.).

The cold water solubility of the non-granular 70% amylose starch powder was 97.4% and the hot water solubility was greater than 99%.

Part B—Converted Starch

Using the process conditions shown below, a converted high amylose corn starch (about 70% amylose) was prepared. A slurry of the starch was treated with 2.5% hydrochloric acid at 52° C. (126° F.) for 16 hours to give a converted starch having a calcium chloride viscosity of 25 seconds. After neutralization with sodium carbonate to a Ph of about 6, the granular converted starch was filtered, washed and dried. The starch was then jet-cooked, and the jet-cooked starch dispersion was conveyed to a pneumatic atomization nozzle top mounted in a 35 foot tall, 16 foot diameter Hensey spray-dryer. The atomized starch mist was dried with air at 204° C. (400° F.).

The converted starch powder was 93.0% soluble in cold water and 97.1% soluble in hot water.

| Process Conditions for Jet Cooking/Spray Drying High Amylose Starch | | |
|---|---|---|
| | Part A | Part B |
| Slurry Solids | 32.0% | 26.2% |
| Cook Solids | 28.0% | 25.0% |
| Jet Cooking Temperature ° C. (° F.) | 143 (290) | 163 (325) |
| Steam Flow | 9.25 lb/min | — |
| Cook Flow | 3.8 gal/min | 6.5 gal/min |
| Nozzle Type[a] | 1J-152 | 1J-152 |
| Dryer Inlet Temp ° C. (° F.) | 230–191 (446–375) | 230–191 (446–375) |
| Dryer Outlet Temp ° C. (° F.) | 82–96 (180–205) | (82–96) (180–205) |
| Atomizing Steam (psig) | 120 | 120 |

[a]Pneumatic nozzle obtained from Spraying System, Inc. (Model 1J; two-fluid).

EXAMPLE 2

This example illustrates the preparation of a pregelatinized granular high amylose starch (about 70% amylose) by the steam-injection/dual atomization spray-drying process.

Unmodified granular corn starch containing about 70% amylose was slurried in water at 25.5% solids. This slurry was pumped by a Matt and Gaulin triplex pump at about 2.4 gallons per minute under about 5,000 psig to three steam atomization nozzles (the dual-atomization nozzles described in FIG. 1 of U.S. Pat. No. 4,280,851) mounted at the top of a 35 foot tall, 16 foot diameter Hensey spray-dryer. Steam at about 165 psig was used to gelatinize and atomize the starch. Air at 200° C. (396° F.) was used to dry the atomized starch mist.

The recovered pregelatinized granular starch powder had a cold water solubility of about 75 percent and a hot water solubility of about 95 percent.

EXAMPLE 3

This example illustrates the preparation of a preextruded fully predispersed high amylose flour.

A sample of an unmodified 70% amylose starch-containing flour was extruded under the extrusion conditions used for cereals (see Example 4) except that the flour was slurried in water to give 13.5% input moisture (20% total moisture) and the barrel temperature was 130° C. The extruded flour was ground to a powder.

EXAMPLE 4

This example illustrates the preparation of ready-to-eat sweetened extruded puffed cereals (also referred to as directly expanded cereals) containing corn, oat, and wheat flours, sugar (i.e., sucrose), and the pregelatinized high amylose starches prepared by the methods of Examples 1 and 2. The starches were incorporated in the following cereal formulations.

| | Part A - Corn-Based Cereal Formulation | | | |
|---|---|---|---|---|
| | Control | | Experimental | |
| Ingredient | % (by weight) | Weight (grams) | % (by weight) | Weight (grams) |
| Starch | 0 | 0 | 10 | 100 |
| Corn Flour | 75 | 7,500 | 60 | 600 |
| Oat Flour | 10 | 1,000 | 15 | 150 |
| Wheat Flour | 10 | 1,000 | 10 | 100 |
| Sugar | 4 | 400 | 4 | 40 |
| Salt | 1 | 100 | 1 | 10 |
| TOTAL | 100% | 10,000 | 100% | 1,000 |

The ingredients for the control were weighed out, charged into a one gallon jar, capped and set on rollers at 100 rpm for three hours to insure sufficient blending. Formulations (1,000 g) containing the starches were prepared in the same manner by replacing a portion of the corn flour. The cereal mixture was extruded using a Werner and Pfleiderer ZSK-30 twin-screw, co-rotating extruded (oil heated barrels) with either an Acrison Model #105 feeder or a Zeranox Model #E-2 feeder.

Extruded conditions were as follows:

| | |
|---|---|
| Barrel Length | 5 (L/D = 15) |
| Screw Configuration | SC-5-18[a] |
| Screw Speed | 250 rpm |
| Die Diameter | 4 mm |
| Dry Feed Rate | 10 kg/hr |
| Input Moisture | 6.7% |
| Barrel Temperature | 60/150/140° C. |

[a]SC-5-18 provides 2 reverse flights, 2 kneading blocks and 65% torque.

Cereal formulation blends were fed into the extruded using the above processing conditions. After steady state conditions were obtained (uniformity of exiting extrudates and steady torque reading), samples were cut at the die and measured for expansion using dial calipers. Samples were immediately toasted in a Narco mechanical convection oven at 200–210° C. for 2–6 minutes. Samples were sealed in glass jars to await evaluation.

Control, experimental, and comparative puffed cereals were evaluated by measuring expansion, cereal bowl-life, texture and eating quality. Bowl-life was evaluated by placing 3.5 g of cereal in 25.0 g of cold milk (35–40° C.). Taste panelists made visual and organoleptical observations at 1 minute intervals to determine when the cereal became unacceptably soggy. Taste panelists also evaluated cereal samples in milk and in dry form for firmness, stickiness, taste, tooth packing, chewiness, meltaway and overall eating quality. The results are shown in Table I.

The results show that the best overall cereals were formulated with starches containing about 70% amylose which had been pregelatinized by the cooking/spray-drying processes disclosed in Examples 1 and 2. The jet-cooked/spray-dried acid-converted 70% amylose starch was good in expansion and eating quality and slightly better in bowl life. The steam-atomized and spray-dried 50% amylose starch was only fair in eating quality and poor bowl life.

The debranched high amylose starches (which contained at least 81% and 78% short chain amylose, respectively) showed good expansion but only fair eating quality.

The uncooked 50% and 70% amylose starches were poor in bowl life, with the 50% amylose starch also being poor in eating quality and the 70% amylose starch also being poor in expansion.

The modified (i.e., derivatized) starch and flour were poor in expansion and bowl life.

Part B—Oat-Based Cereal Formulation

A second experiment (see Table II) with a sugar sweetened oat-based cereal demonstrated that while excellent bowl life could be achieved by formulating cereals with 50–70% amylose starches that had not been pregelatinized, these cereals were commercially unacceptable. The control containing no starch was a standard extruded sweetened oat cereal representative of commercially used formulations. The sweetened cereal containing the non-pregelatinized starch was very hard, the texture was tough, and the eating quality was very poor. Notably, expansion during extrusion was much more limited for these starches than for the pregelatinized starch samples.

The pregelatinized starches containing at least 70% amylose had expansion and eating qualities clearly superior to those of the control containing no starch. The converted starch was better than the non-converted starch in this sweetened cereal formulation.

EXAMPLE 5

This example illustrates the preparation of ready-to-eat extruded flaked wheat cereals sweetened with a mixture of sugar and malt syrup.

The pregelatinized high amylose starches and control were prepared by the methods of Examples 1 and 2 and incorporated into the following cereal formulation.

| | Part A - 70% Amylose Starches Cereal Formulation | | | |
|---|---|---|---|---|
| | Control | | Experimental | |
| Ingredient | % (by weight) | Weight (grams) | % (by weight) | Weight (grams) |
| Starch | 0 | — | 15.0 | 300 |
| Wheat Flakes | 87.2 | 4360 | 72.26 | 1444 |
| Sugar | 8.7 | 435 | 8.7 | 174 |
| Salt | 2.4 | 120 | 2.4 | 48 |
| Malt Syrup* | 1.6 | 80 | 1.6 | 32 |
| Trisodium Phosphate | 0.01 | 5 | 0.1 | 2 |
| Total | 100% | 5000 | 100 | 2000 |

*Represents a liquid at 50% solids.

The dry ingredients, except the wheat flakes were charged into a one gallon jar, capped and set on rollers at 100 rpm for at least 3 hours to insure sufficient blending. The dry ingredients, wheat flakes, and malt syrup were separately added to the extruded. The wheat flakes were added first followed by the other dry ingredients. The malt syrup was added as a solution and introduced about half way down the length of the extruded.

Similar formulations were prepared with 10% and 5% starch replacements. For the 10% starch replacement, 200 g starch was used and the wheat flakes were reduced to 1544 g (77.2%). For the 5% formulation, the starch added was 100 g and the wheat flakes were 1644 g (82.2%).

The cereal formulations were extruded using the Werner and Pfleiderer ZSK-30 twin-screw co-rotating extruded described in Example 4 with separate feeders for the wheat flakes, dry ingredients, and malt syrup.

The extruded conditions were set as follows:

| | |
|---|---|
| Barrel Length | 12 (L/D = 36) |
| Screw Configuration | SC 12-44 |
| Screw Speed | 250 |
| Die Diameter | 1 × 4 mm die |
| Dry Feed Rate | 10 kg/hour |
| Input Moisture | 30% |
| Zone Temperature | 0/150/43/32/water cooling |

After steady state conditions were obtained, a sample was taken in the form of a half-product (i.e., a moist pellet). This half-product was made by cutting the extrudate as it exited the die into pellets approximately ¼ inch long. Half-products containing the jet-cooked/spray-dried 70% amylose starch and the jet-cooked/spray-dried converted 70% amylose starch ($CaCl_2$ viscosity of 30–44 seconds) were divided into two samples. The first sample was refrigerated after extrusion and flaked the following day to allow retrogradation to occur.

Flakes were made by taking the moist pellets and individually feeding them into a coated double drum-drier which simulated the calendering or flaking rollers used in the cereal industry. Approximately a 1/16 inch gap was left between the two drums. This provided enough space for the pellet to be compressed into a flake. The drums were allowed to rotate during the process. The compressed flakes were received onto a punctured aluminum baking tray and toasted in a conventional oven at 200–210° C. for a period of 2 to 10 minutes. Final flake moisture was 3–5%. After toasting, the samples sealed in glass jars to await evaluation.

Control and experimental samples were evaluated by measuring the milk absorption (bowl life) and crispness and crunch after the milk absorption. A total of 10 g of the sweetened flaked cereal was placed in 150 g of milk, the milk was drained off after 6 minutes, and the cereal was weighed and evaluated for texture and eating quality. The results are shown in Table III.

The samples that incorporated the pregelatinized non-converted and converted 70% amylose starches at the 15% level were acceptable in all attributes, especially color, flavor, texture and bowl-life. Despite the milk absorption the flakes were still crunchy.

Samples that contained the pregelatinized 70% amylose starch at lower levels were at least equal to the control in terms of color, flavor, texture, crispiness and bowl life. The jet-cooked/spray-dried unmodified starch displayed enhanced bowl life and crispness at the 10% level. The jet-cooked/spray-dried converted starch displayed enhanced crispiness and a bowl life similar to the control. See Table IV.

Part B—85% Amylose Starch

A jet-cooked/spray-dried starch containing about 85% amylose was incorporated into the sweetened extruded wheat flake at the 15% level and evaluated. The sample had enhanced crispiness (10) and a bowl life (8) similar to the control.

EXAMPLE 6

The extruded flour of Example 3 was added at a 50% corn flour replacement level to a sweetened corn-based cereal formulation containing 50 parts corn flour, 40 parts oat flour, and 10 parts sugar. The flour was about 24% by weight of the total cereal formulation. The experimental and control cereals were formulated and extruded into puffed cereals by the method of Example 4. Cereal bowl-life was evaluated by the method of Example 4. The bowl-life was between 1 and 2 minutes longer than that of the control cereal. Thus, the preextruded high amylose flour provided improved water resistance and crispness in sweetened extruded cereal.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

TABLE I[a]

Evaluation of Extruded Corn-Based Cereals Containing High Amylose Starch

| Sample | Expansion (diameter in mm) | Eating Quality | Bowl Life-minutes (% relative to control) |
|---|---|---|---|
| Control: No Starch[b] | 13.0 | Good | 1.5 (0%) |
| Steam-Atomized/Spray-Dried Starches[c] | | | |
| 70% Amylose Starch | 14.5 | Good | 5.5 (300%) |
| 50% Amylose Starch (Comparative) | 14.5 | Fair | 2.0 (33%) |
| Jet-Cooked/Spray-Dried Starches and Flour[d] | | | |
| 70% Amylose Starch | 14.5 | Good | 6.0 (270%) |
| Acid-Converted 70% Amylose Starch (25 sec CaCl$_2$ viscosity) | 15.0 | Good | 2.0 (35%) |
| 70% Amylose Corn Flour (Comparative) | 11.0 | Fair | 4.0 (260%) |
| Debranched Starch[e] (Comparative) | | | |
| Crystalline waxy maize (81% short chain amylose) | 16.0 | Fair | 5.5 (270%) |
| Spray-dried waxy maize (78% short chain amylose) | 15.0 | Fair | 2.5 (70%) |
| Granular Uncooked Starch and Flour (Comparative) | | | |
| Granular 70% Amylose Starch[f] | 7.5 | Good | 3.0 (100%) |
| Granular 70% Amylose Starch[g] | 8.0 | Poor | 4.0 (170%) |
| Granular 50% Amylose Starch[f] | 13.0 | Poor | 2.5 (70%) |
| Modified Uncooked Starch and Flour (Comparative) | | | |
| Granular 50% Amylose Starch[g] (5% Acetylated) | 15.0 | Poor | 2.0 (35%) |
| Granular 70% Amylose Flour[g] (7% Propylene oxide-treated) | 7.5 | Good | 3.0 (100%) |

[a]See Example 4 for cereal preparation.
[b]See Cereal Formulation Control in Example 4.
[c]Starch was pregelatinized by the method of Example 2.
[d]Starch was pregelatinized by the method of Example 1.
[e]Starch was enzymatically debranched and solubilized by the method of Example 3 of U.S. Pat. No. 4,971,723 (issued November 20, 1990 to C.-W. Chiu).
[f]Starches and flour were not solubilized before formulating the cereal.
[g]Starch derivatives were prepared by the methods disclosed in U.S. Pat. No. 4,937,091, (issued June 26, 1990, to Zallie, et al.).

TABLE II

Evaluation of Extruded Oat-Based Cereals Containing High Amylose Starch

| Sample[a] | Expansion (inches) | Crispness[b] | Bowl Life[c] | Overall Eating Quality[d] |
|---|---|---|---|---|
| Control: No Starch | .170 | 4 | 10 | 18 |
| Steam-Atomized Spray Dried[e]: | | | | |
| 70% Amylose Starch | .254 | 10 | 6 | 24 |
| Jet-Cooked/Spray Dried Starches[f]: | | | | |
| 70% amylose starch | .235 | 8 | 5 | 20 |
| Acid-Converted | .288 | 9 | 8 | 27 |
| 70% Amylose Starch | | | | |
| (35 sec CaCl₂ viscosity) | | | | |
| Granular Uncooked Starch | | | | |
| (Comparative) | | | | |
| 50% Amylose | .158 | 3 | 10 | 16 |
| 70% Amylose | .171 | 3 | 10 | 17 |
| Modified Granular | | | | |
| Uncooked Starch | | | | |
| (Comparative) | | | | |
| 50% Amylose Starch[g] | .192 | 3 | 6 | 14 |

[a]Cereals contained 70% oat flour, 20% corn flour, 10% sugar. Replacements contained 15% starch in place of an equal quantity of corn flour.
[b]10 = most crisp
[c]Subjective evaluation of 10 g cereal in 100 g milk after 6 minutes. 10 = longest bowl life.
[d]Subjective evaluation which includes bowl life, expansion, texture and crispness. 30 = highest eating quality.
[e]Starch was pregelatinized by the method of Example 2.
[f]Starch was pregelatinized by the method of Example 1.
[g]Acetylated (5%) high amylose corn starch (50% amylose).

TABLE III

Evaluation of Flaked Cereals Containing 15% High Amylose Starches

| Samples | Milk Absorption (grams absorbed in 6 minutes) |
|---|---|
| Control (No Starch) | 16.2 |
| Jet-Cooked/Spray-Dried Starch[a] | |
| 70% Amylose flaked same day | 15.5 |
| 70% Amylose refrigerated overnight and flaked next day | 16.7 |
| Converted 70% Amylose (35 sec. CaCl₂ viscosity) flaked same day | 16.2 |
| Converted 70% Amylose (35 sec. CaCl₂ viscosity) refrigerated overnight and flaked next day | 15.2 |
| Stem-Atomized/Spray-Dried Starch[b] | |
| 70% Amylose | 17.2 |

[a]Starch was pregelatinized by the method of Example 1.
[b]Starch was pregelatinized by the method of Example 2.

TABLE IV

Evaluation of Extruded Flaked Cereals Containing 5%, 10%, and 15% High Amylose Starches

| Samples | Crispness[b] | Bowl Life[c] |
|---|---|---|
| Control (No Starch) | 9 | 8 |
| Jet-Cooked/Spray-Dried Starch[a] | | |
| 70% Amylose at 5% | 9 | 8 |
| 70% Amylose at 10% | 10 | 10 |
| 70% Amylose at 15% | 10 | 10 |
| 70% Converted Amylose (35 sec. CaCl₂ viscosity) at 5% | 9 | 8 |
| 70% Converted Amylose (35 sec. CaCl₂ viscosity) at 10% | 10 | 8 |
| 70% Converted Amylose (35 sec. CaCl₂ viscosity) at 15% | 10 | 8 |

[a]Starch was pregelatinized by the method of Example 1.
[b]Subjective evaluation of the force required to fracture the flakes and the way the flakes hold up while being chewed. Ten (10) is the best; one (1) is the worst.
[c]Subjective evaluation based on chewing the flakes after 10 grams of cereal was allowed to stand in milk for 5 minutes. Ten (10) is the best; one (1) is the worst.

What is claimed is:

1. A method for preparing a dry, sweetened extruded ready-to-eat puffed cereal consisting essentially of the steps of:

(a) formulating a cereal mixture comprising an effective amount of one or more cereal flours, a sweetening amount of one or more sweeteners, about 4 to about 28% by weight added water, and an effective amount of about 5 to about 20% by weight of a pregelatinized cold or hot water soluble high amylose starch or flour having an amylose content of at least about 70% by weight; which starch selected from the group consisting of (i)

pregelatinized spray-dried non-granular unmodified or converted high amylose starch characterized in that the starch is substantially non-crystalline, substantially non-retrograded, and fully predispersed; (ii) a pregelatinized, spray-dried granular unmodified or converted high amylose starch characterized in that the starch is uniformly gelatinized and in the form of granular indented spheres, with at least a majority of the granules being whole and unbroken and being in the form of loosely-bound agglomerates or individual granules; and (iii) a combination thereof;

(b) extruding the cereal mixture at a temperature of about 120 to about 160° C. and at a pressure of about 100 up to about 500 psi, with the temperature at the exit being higher than the temperature at the inlet so that moisture is flashed off and the cereal puffed; wherein the extruded cereal mixture exhibits superior expansion to that of an extruded cereal mixture where the same amount of a corresponding non-pregelatinized, cold or hot water soluble high amylose starch or flour is substituted for the pregelatinized high amylose starch of step (a);

(c) cutting the puffed extrudate into pieces; and (d) toasting the cut pieces.

2. The method of claim 1, wherein the cereal flour is a corn, oat, or wheat flour or mixtures thereof; wherein the sweetener is a sugar, a syrup, a fruit juice concentrate, or an artificial sweetener; wherein the amount of the pregelatinized starch is about 5 to about 15%; by weight wherein the amount of added water is sufficient to provide a total water content in the cereal mixture of about 15 to about 22%; by weight wherein the inlet temperature is about 25 to about 40° C. and the outlet temperature is about 130 to about 160° C.; and wherein the toasting is carried out at about 180 to about 250° C. for about 30 seconds to about 3 minutes.

3. The method of claim 2, wherein the sugar is sucrose or crystalline fructose; wherein the syrup is a corn syrup, a high fructose corn syrup, an invert syrup, or a malt syrup; wherein the fruit concentrate is apple juice, pear juice, or white grape juice; and wherein the artificial sweetener is aspartame.

4. The method of claim 2, wherein the sweetener is sucrose present in amount of about 3 to about 20% by weight.

5. The method of claim 1, wherein the pregelatinized starch is the unmodified high amylose starch or a pregelatinized starch mixture of the unmodified high amylose corn starch and an unmodified corn starch.

6. The method of claim 1, wherein the pregelatinized starch is the converted high amylose starch, which converted starch has a calcium chloride viscosity of about 25–45 seconds.

7. A method for preparing a dry, sweetened, extruded ready-to-eat flaked cereal consisting essentially of the steps of:

(a) formulating a cereal mixture comprising an effective amount of one or more cereal flours, a sweetening amount of one or more sweeteners, about 4 to about 28% by weight added water, and an effective amount of about 5 to about 20% by weight of a pregelatinized cold or hot water soluble high amylose starch or flour having an amylose content of at least about 70% by weight, selected from the group consisting of (i) pregelatinized, spray-dried non-granular unmodified or converted high amylose starch characterized in that the starch is substantially non-crystalline, substantially non-retrograded, and fully predispersed; (ii) a pregelatinized, spray-dried granular unmodified as converted high amylose starch characterized in that the starch is uniformly gelatinized and in the form of granular indented spheres, with at least a majority of the granules being whole and unbroken and being in the form of loosely-bound agglomerates or individual granules; and (iii) a combination thereof, (b) extruding the cereal mixture at a temperature of about 120 to about 160° C. and at a pressure of about 100 to about 500 psi, with the temperature at the exit being lower than the temperature at the inlet so that a moist half-product is extruded; wherein the extruded cereal mixture exhibits superior expansion to that of a cereal mixture where the same amount of a corresponding non-pregelatinized, cold or hot water soluble high amylose starch or flour is substituted for the pregelatinized high amylose starch of step (a)

(c) cutting the moist half-product into pieces;

(d) compressing the cut pieces; and (e) toasting the compressed pieces.

8. The method of claim 7, wherein the cereal flour is a corn, oat, or wheat flour, or mixtures thereof; wherein the sweetener is a sugar, a syrup, a fruit concentrate, or an artificial sweetener; wherein the amount of added water is sufficient to provide a total water content in the cereal mixture of about 25 to about 35%; by weight wherein the inlet temperature is about 25° to 40° C.; and the outlet temperature is about 45 to about 80° C.; and wherein the toasting is carried out at about 180 to about 250° C. for about 2 to about 6 minutes.

9. The method of claim 8, wherein the sugar is sucrose or crystalline fructose; wherein the syrup is a corn syrup, a high fructose corn syrup, an invert syrup, or a malt syrup; wherein the fruit concentrate is apple juice, pear juice, or white grape juice; and wherein the artificial sweetener is aspartame.

10. The method of claim 8, wherein the pregelatinized starch is about 10 to about 15% by weight wherein the sweetener is sucrose present in an amount of about 3 to about 20% or malt syrup present in an amount of about 1 to about 3%, and wherein the toasting is carried out at about 200 to about 210° C. for about 2 minutes.

11. The method of claim 7, wherein the pregelatinized starch is the unmodified high amylose starch or a pregelatinized starch mixture of the unmodified high amylose corn starch and an unmodified corn starch.

12. The method of claim 11, wherein the pregelatinized starch is the unmodified high amylose starch and the starch has an amylose content of about 85% by weight.

13. The method of claim 7, wherein the pregelatinized starch is the converted high amylose starch, which starch has a calcium chloride viscosity of about 30–44 seconds.

14. The method of claim 7, further comprising the step of refrigerating the moist extrudate for about 1 to about 16 hours prior to the step of compressing the moist pieces.

15. A sweetened puffed cereal characterized by improved expansion, crispness, and/or bowl life which is prepared by the method of claim 1.

16. A sweetened flaked cereal characterized by improved crispiness and/or bowl life which is prepared by the method of claim 7.

17. A method for preparing a dry, sweetened extruded ready-to-eat cereal puffed or flaked cereal consisting essentially of the steps:

(a) formulating a cereal mixture comprising an effective amount of cereal flours, a sweetening amount of one or more sweeteners, 4–28% by weight added water, and an effective amount of about 5–25% by weight of a preextruded fully dispersed high amylose starch or flour having an amylose content of at least about 70% by weight;

(b) extruding the cereal mixture at a temperature of about 120 to about 160° C. and at a pressure of about 100 up to about 500 psi with the temperature at the exit being higher than the temperature at the inlet so that moisture is flashed off if a puffed cereal is being prepared or with the temperature at the exit being lower than the temperature at the inlet so that the moisture is retained if a flaked cereal is being prepared, wherein the extruded cereal mixture exhibits superior expansion to that of an extruded cereal mixture where the same amount of a corresponding non-pregelatinized, cold or hot water soluble high amylose starch or flour is substituted for the pregelatinized high amylose starch of step (a)

(c) cutting the extrudate into pieces;

(d) compressing the moist extrudate if a flaked cereal is being prepared; and (e) toasting the extruded pieces from step (c) or compressed extruded pieces from step (d).

18. The method of claim 17, wherein the cereal flour is corn, oat, or wheat flour or mixtures thereof; wherein the sweetener is a sugar, a syrup, a fruit concentrate, or an artificial sweetener, and wherein the toasting is carried out at about 180 to about 250° C. for from about 30 seconds to about 6 minutes for the puffed cereal or for about 2 to about 6 minutes for the flaked cereal.

19. The method of claim 17, wherein the preextruded, fully dispersed high flour is used at about 24% by weight for formulating a puffed cereal and is prepared by slurrying the flour or starch in water to a total moisture content of about 10–25% by weight, extruding the slurried starch or flour at about 130° C., and grinding the extruded flour and wherein the sweetener is sucrose or a malt syrup.

* * * * *